Dec. 17, 1935.            T. P. LOHRMAN            2,024,773

WINDOW CONSTRUCTION FOR VEHICLE BODIES

Original Filed Feb. 24, 1934

Inventor

Thomas Paul Lohrman

Patented Dec. 17, 1935

2,024,773

UNITED STATES PATENT OFFICE 2,024,773

WINDOW CONSTRUCTION FOR VEHICLE BODIES

Thomas Paul Lohrman, Oakland, Calif.

Continuation of application Serial No. 712,700, February 24, 1934. This application January 15, 1935, Serial No. 1,876

3 Claims. (Cl. 296—48)

The invention relates to improvements in window construction for vehicle bodies having glass panels with upwardly and downwardly sliding movements; the invention was clearly described and claimed by applicant in a former application (Serial No. 712,700), filed Feb. 24, 1934, for Window construction for vehicle bodies of which this application is a continuation. It is believed that the present application presents the essentials of said invention in a more clear and precise form.

The invention provides a means whereby the glass panels may be positioned flush with the adjacent outer frame work.

The prevalent type of window construction of vehicle bodies employs frame members protruding outwardly from the glass panels, resulting in unnecessary air resistance. The principal object of the present invention is to provide a construction whereby the air resistance may be reduced to a minimum.

Another object is to provide for tilting the glass inwardly at the top.

Figure 1:
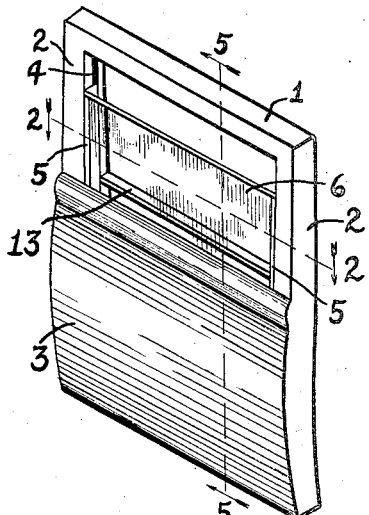
Figure 5:
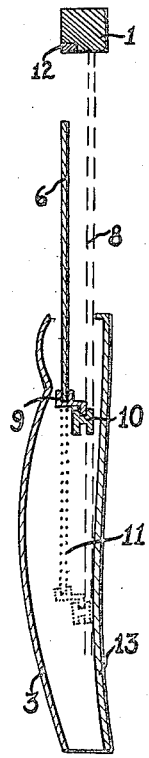
Figure 6:
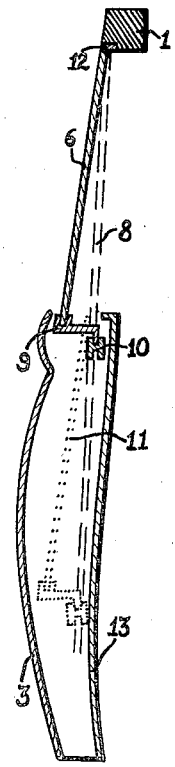
Figure 7:
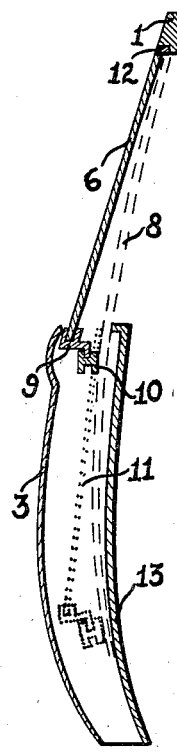
Figure 2:
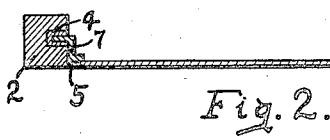
Figure 3:
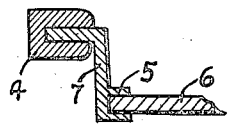
Figure 4:
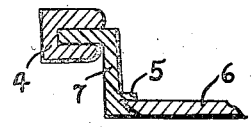

The invention is illustrated in the accompanying drawing, in which Fig. 1 is a perspective of a glass panel and adjacent framework; Fig. 2 is an enlarged cross-sectional view taken substantially on line 2—2 of Fig. 1; Figs. 3 and 4 show two forms of glass channels; Fig. 5 is an enlarged cross-sectional view taken substantially on line 5—5 of Fig. 1; Figs. 6 and 7 are modified forms of Fig. 5.

As shown in the drawing, the framework consists of an upper frame member 1, and two upright frame members 2. Secured to the two upright frame members 2, is an outer shell or covering 3 and an inner wall 13. The space between the outer shell 3 and inner wall 13 forms a chamber wherein the glass panel 6 may be lowered either partially or wholly.

Two channels 5 are mounted to the upright edges of the glass panel 6; Fig. 3 showing the conventional type of channel, while Fig. 4 shows the glass panel 6 have its edge portion beveled so that its outer surfaces may be flush with the outer flange of channel 5.

The channels 5 are provided with L shaped flanges 7 which act as guides, and are slidably positioned within the upright run channels 4.

Whenever the glass panel 6 is raised to a closed position, the upper edge of said panel 6 strikes against a resilient bumper strip 12, secured to the frame member 1.

Along the lower edge of the glass panel 6 is a channel member 9 which acts in conjunction with a regulator member 10 for the purpose of raising and lowering the panel 6.

In Fig. 5, the glass panel 6 is mounted in a vertical position, the broken lines 8 indicating the relative position of the upright run channels 4. Whenever the glass panel 6 is lowered, it occupies the position indicated by the dotted lines 11.

In Fig. 6, the broken lines 8 show the upright run channels 4 to be vertically positioned, while the glass panel 6 tilts inwardly at the top. Whenever lowered, the glass panel 6 occupies the position indicated by the dotted lines 11.

In Fig. 7, the glass panel 6 tilts inwardly to a greater degree than in Fig. 6. As indicated by the broken lines 8, the upright run channels 4 are curved inwardly so as to allow the glass panel 6 to swing inwardly at the bottom while being lowered. This minimizes the space required between the outer shell 3 and inner wall 13, and allows for a greater degree of inclination to the glass panel 6 than would be possible with the straight run channels 4 shown in Fig. 6. The dotted lines 11 indicate the position of the glass panel 6 when lowered.

Fig. 2 shows the L shaped flange members 7 proportioned to the frame members 2 so that the glass panel 6 may be flush with the outer edges of said frame members 2.

By tilting the glass panel 6, and employing the run channels 4 and flanged guides 7 as shown, all the advantages as previously set forth have been provided for.

What I claim as new and desire to secure by Letters Patent, is:

1. A window construction having upright frame members and run channels secured to said frame members; a glass panel having flanged guides secured to its upright edge portions, said flanged guides being slidably engaged within said run channels; said glass panel being inclined to said run channels.

2. A window construction having upright frame members and run channels secured to said frame members; a glass panel having upwardly and downwardly sliding movements within said frame members; said glass panel being inclined with respect to said sliding movements; means for directing said sliding movements of said glass panel, comprising flanged guides secured to the upright edge portions of said glass panel and slidably engaged within said run channels.

3. A window construction comprising upright frame members and run channels secured to said frame members; a glass panel mounted within said frame members and inclined to said run channels; flanged guides secured to the upright edge portions of said glass panel and slidably engaged within said run channels.

THOMAS PAUL LOHRMAN.